S. C. PRATT.
FURNITURE CASTER.
No. 81,001. Patented Aug. 11, 1868.
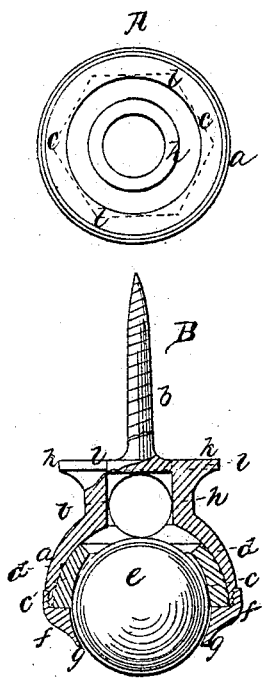
Witnesses.
Francis Ginter
J. B. Crosby
Inventor
Seymour Clesson Pratt.

United States Patent Office.

SEYMOUR CLESSON PRATT, OF BOSTON, MASSACHUSETTS.

*Letters Patent No. 81,001, dated August 11, 1868.*

IMPROVED FURNITURE-CASTER.

The Schedule referred to in these Letters Patent and making part of the same.

TO ALL WHOM IT MAY CONCERN:

Be it known that I, SEYMOUR CLESSON PRATT, of Boston, in the county of Suffolk, and State of Massachusetts, have invented an Improved Furniture-Caster; and I do hereby declare that the following, taken in connection with the drawings which accompany and form part of this specification, is a description of my invention sufficient to enable those skilled in the art to practise it.

My invention relates to the construction of furniture-casters, of that class known as ball-casters, each of which employs as a friction-roller a small ball or sphere, so arranged as to turn freely in every direction.

In the common constructions this ball is combined with so many auxiliary devices as to render the caster complicated, expensive, and unreliable; and the principal object in making my improved caster has been to so construct a ball-caster that it should be cheap, simple in construction, enduring, and not liable to get out of order.

My improvement consists, primarily, in combining with a metal ball-containing socket (having provision for retaining the ball within it) a glass ball-seat or bearing, against which the ball is pressed and rotates.

The drawings represent a caster embodying my invention.

A shows a bottom view of the socket, the ball-retaining ring being removed.

B shows the caster, partly in central section and partly in elevation.

$a$ denotes an inverted cup or socket-piece, made of metal, and preferably provided with a central screw-spindle or shank, $b$, for attaching the caster to the chair-leg. Within the lower part of the socket-piece is a glass bearing or ring, $c$, preferably fixed to the wall of the socket-piece by cement, $d$. I sometimes interpose an elastic cushion between the glass and the socket-wall, but generally the cement is sufficient.

Within this glass bearing is placed a ball, $e$, preferably made of wood, and confined within the socket by a screw-ring, $f$, having a flange, $g$, less in diameter than the diameter of the ball, the ball being loose within the socket, but projecting through the ring, as seen at B.

When the caster is moving in either direction, one side of the ball bears against the adjacent side of the glass, and the smooth, polished surface of the glass enables the ball to turn very freely thereagainst, or with but very slight friction.

At the top of the main socket is a smaller socket, $h$, which contains a small ball, $i$, whose lower surface projects down below the socket, so that the top of the ball $e$, when pressed upwards, bears against the lower surface of ball $i$, as seen at B.

Now it will readily be seen that, as the bearing-surface of the two rotating balls, relatively to each other, is only at one point, (of each,) and as the ball $e$ bears at its side only when a very small surface of the glass socket-ring, (the ring being larger in diameter than the ball,) the friction is so very slight, under any ordinary weight, or even under the weight of the heaviest furniture, (such furniture as the weight of a piano-forte,) these casters enable furniture mounted upon them to be moved with the greatest facility, while, as the ball $e$ rotates freely in every direction, the whole of its surface is made available as a roller.

To enable the spindle $b$ to be easily screwed into a furniture-leg its whole length, or so as to bring the flat top or flange $k$ of the socket-piece squarely and firmly against the bottom of the leg, I make the edge of such flange $k$ with parallel or polygonal faces, $l$, for application of a suitable wrench.

It will thus be seen that the whole construction is exceedingly simple, the parts being very few, and so composed and arranged as to render it impossible for them to become displaced, and almost impossible for casters so made to fail to roll freely at all times, under any superimposed weight.

I claim, in combination with the ball-containing socket-piece $a$, the glass bearing-ring $c$, against which the side of the caster-ball $e$ rotates, substantially as described.

I also claim, in combination with such socket-ring and ball, the minor socket and ball $h$ $i$, arranged substantially as shown and described.

SEYMOUR CLESSON PRATT.

Witnesses:
   J. B. CROSBY,
   FRANCIS GOULD.